(12) United States Patent
Fareid

(10) Patent No.: US 8,133,458 B2
(45) Date of Patent: Mar. 13, 2012

(54) REACTOR AND THE USE THEREOF FOR PRODUCING CYANIDES

(75) Inventor: Erik Fareid, Langesund (NO)

(73) Assignee: EICPROC AS, Langhus (NO)

( * ) Notice: Subject to any disclaimer, the term of this patent is extended or adjusted under 35 U.S.C. 154(b) by 195 days.

(21) Appl. No.: 12/529,512

(22) PCT Filed: Mar. 3, 2008

(86) PCT No.: PCT/NO2008/000077
§ 371 (c)(1),
(2), (4) Date: Oct. 7, 2009

(87) PCT Pub. No.: WO2008/105669
PCT Pub. Date: Sep. 4, 2008

(65) Prior Publication Data
US 2010/0098603 A1    Apr. 22, 2010

(30) Foreign Application Priority Data
Mar. 1, 2007    (NO) .................................... 20071153

(51) Int. Cl.
*B01J 8/04*    (2006.01)
*B01J 19/00*   (2006.01)
*B01J 8/00*    (2006.01)
*B01J 8/02*    (2006.01)
*B01J 35/02*   (2006.01)
*C01C 3/08*    (2006.01)

(52) U.S. Cl. ........ 422/630; 422/129; 422/187; 422/211; 422/198; 422/600; 422/607; 422/631; 422/632; 422/633; 422/634; 422/635; 422/638; 422/641; 422/642; 422/644; 422/646; 422/649; 423/371; 423/379

(58) Field of Classification Search .................. 422/129, 422/187, 600, 607, 630–635, 638, 641, 642, 422/644, 646, 198, 211; 423/364, 371, 372, 423/376, 379; 261/100
See application file for complete search history.

(56) References Cited

U.S. PATENT DOCUMENTS
2,750,266 A * 6/1956 Roberts et al. ................ 422/202
(Continued)

FOREIGN PATENT DOCUMENTS
WO    WO 91/08982 A1 * 6/1995
(Continued)

OTHER PUBLICATIONS
R.J.H. Voorhoeve et al., "Hydrogen Cyanide Production During Reduction of Nitric Oxide over Platinum Catalysts" Science (Washington DC, USA) 1975, 190 (4210, pp. 149-151.

*Primary Examiner* — Walter D Griffin
*Assistant Examiner* — Natasha Young
(74) *Attorney, Agent, or Firm* — Schneck & Schneck; Thomas Schneck

(57) ABSTRACT

A reactor for converting methane, ammonia and oxygen and alkaline or alkaline earth hydroxides into alkaline or alkaline earth cyanides by two-stage reactions comprising a first stage with a gas inlet, wherein the first stage is formed by a cone with distribution plates providing an even gas distribution over the catalyst material wherein the distribution plates are located between the gas inlet of the reactor and catalyst material and the distribution plates being perforated with a number of holes, with the distribution plates spaced from each other in the flow direction of the gas, the first distribution plate(s) functioning mainly to distribute the gas, whereas the last distribution plate works as a heat radiation shield and as a distribution plate facing the catalyst material, and wherein the catalyst material is present in the form of catalyst gauze fixed by catalyst weights.

13 Claims, 3 Drawing Sheets

U.S. PATENT DOCUMENTS

Figure 1:
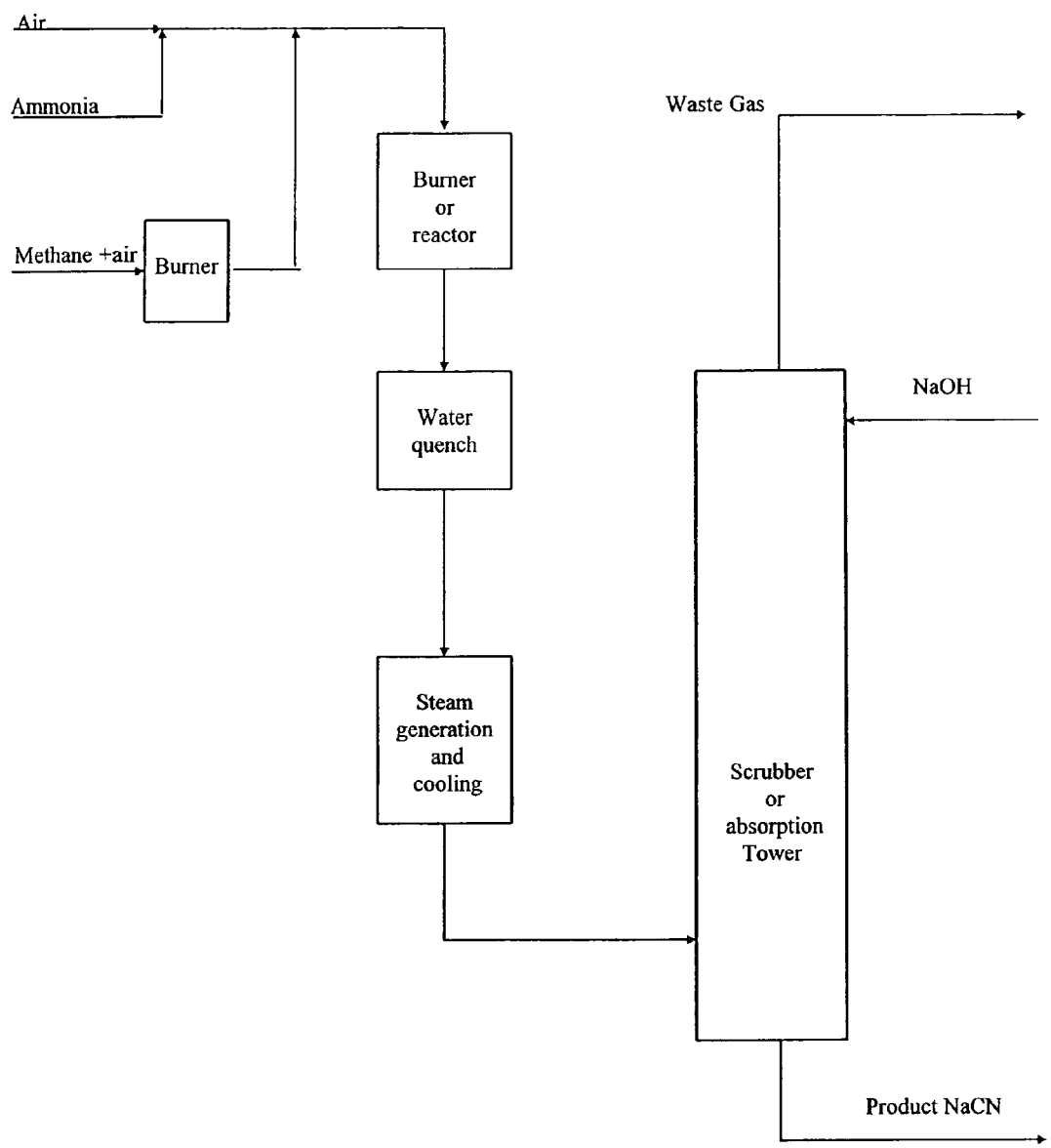

| | | | |
|---|---|---|---|
| 3,056,655 A * | 10/1962 | Inman | 423/376 |
| 3,215,495 A * | 11/1965 | Andresen et al. | 423/376 |
| 3,545,939 A * | 12/1970 | Cox, Jr. et al. | 502/439 |
| 4,134,425 A | 1/1979 | Gussefeld et al. | |
| 6,221,327 B1 | 4/2001 | DeCourcy et al. | |
| 2003/0175195 A1 * | 9/2003 | Steffen | 423/376 |

FOREIGN PATENT DOCUMENTS

| WO | WO 99/01212 A * | 1/1999 |
|---|---|---|

* cited by examiner

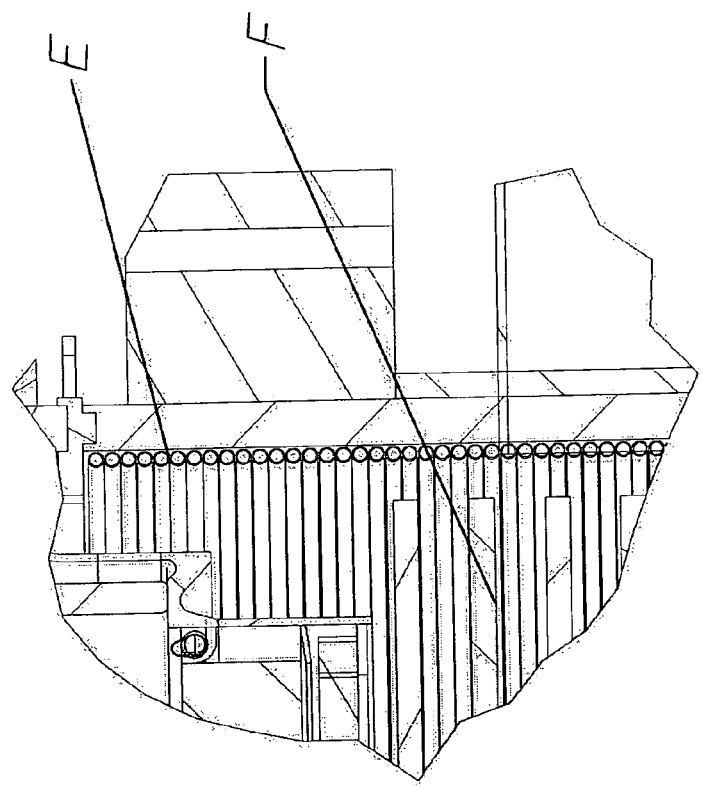
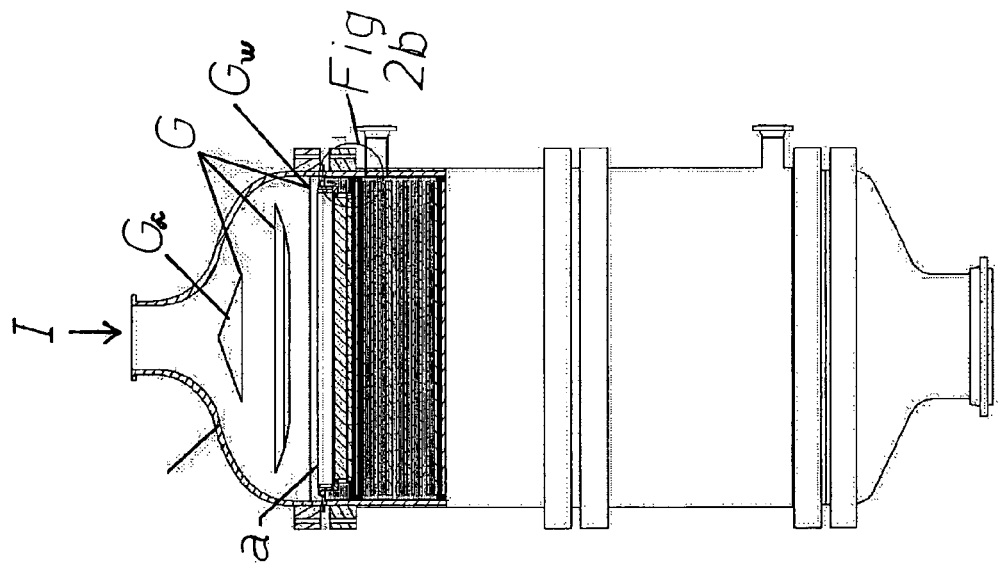

REACTOR AND THE USE THEREOF FOR PRODUCING CYANIDES

BACKGROUND OF THE INVENTION

The present invention relates to a reactor for making hydrogen cyanide and sodium cyanide. The present reactor is using a process that is an improvement over the previously known Andrussow process for making hydrogen cyanide (HCN) and sodium cyanide (NaCN). In particular, the reactor according to the invention is using a process relating to improvement of the efficiency of the new process (hereafter called the new process) compared to the Andrussow process.

The invention thus in one embodiment relates to a reactor for converting methane, ammonia and oxygen and alkaline or alkaline earth hydroxides into alkaline or alkaline earth cyanides by two-stage reactions;

1—a catalytic reaction process over a catalyst material between ammonia, methane and oxygen wherein hydrogen cyanide, carbon monoxide/dioxide and water are formed, wherein the reaction gases are mixed, and 2—the gases being cooled prior to being absorbed with an alkaline or alikaline earth hydroxide for producing a corresponding cyanide, wherein the reactor comprises a first stage with a gas inlet, wherein the first stage is formed by a cone with distribution plates providing an even gas distribution over the catalyst material, wherein the distribution plates are located between the gas inlet of the reactor and a catalyser basket within the reactor located beneath the distribution plates, the distribution plates and being perforated with a number of holes with a diameter less than 20 mm and with a pitch larger than 1 diameter, with the distribution plates spaced from each other in the flow direction of the gas, the first distribution plate(s) functioning mainly to distribute the gas whereas the last distribution plate works as a heat radiation shield and as a distribution plate facing the catalyst gauze, and wherein the catalyst gauze is present in the form of catalyst gauze(s) fixed by catalyst weights.

Hydrogen cyanide (HCN) is one of the smaller volume industrial chemicals, which nevertheless is quite important in the chemical industry. In particular, HCN is used for the manufacture of cyanuric chloride, methyl methacrylate, adiponitrile (for nylon-6,6), sodium cyanide, ferrocyanides and chelating agents. Sodium Cyanide is mainly used for the heap leaching of Gold (Au) and Silver (Ag).

At present, almost all of the world's production of HCN/NaCN is made by one of three processes:

(1) The Andrussow process in which ammonia, methane and oxygen are reacted over an oxidation catalyst to form HCN, CO, water and $H_2$;

(2) The "methane-ammonia direct process" or Degussa process in which ammonia and methane are reacted in the absence of air in externally heated tubes containing platinum/rhodium catalyst to form HCN and hydrogen; and (3) The Shawinigan process in which ammonia and propane are passed between spaced electrodes within a fluidized bed of coke. In addition to the above processes for making HCN directly, it is also made as a by-product in the manufacture of acrylonitrile by reaction of propylene and ammonia over an oxidation catalyst.

To produce NaCN, all different processes must absorb HCN with sodium hydroxide (NaOH).

Though each of these processes is used commercially, by far the most widely used is the Andrussow process. In the Andrussow process, a vapour phase mixture of oxygen-containing gas (usually air), ammonia ($NH_3$) and methane is contacted with platinum metal catalyst at a temperature of about 1200° C. by which part of the methane is burned to furnish heat to the methane-ammonia reaction, which is endothermic. The overall reaction of the Andrussow process is as follows:

$$CH_4 + NH_3 \rightarrow HCN + 3H_2$$

$$CH_4 + NH_3 + 3/2 O_2 \rightarrow HCN + 3H_2O$$

$$2H_2 + O_2 \rightarrow 2H_2O$$

$$HCN + NaOH \rightarrow NaCN + H_2O$$

The overall reactions in the new process used in the reactor according to the present invention also include:

$$CH_4 + O_2 \rightarrow CO + H_2O + H_2$$

$$CH_4 + 2O_2 \rightarrow CO_2 + 2H_2O$$

$$NH_3 + O_2 \rightarrow NO + H_2O + H_2$$

$$NO + CO + 3/2 H_2 \rightarrow HCNO + H_2O$$

$$NO + CO + 3/2 H_2 \rightarrow HNCO + H_2O$$

$$HNCO + NaOH \rightarrow NaCN + H_2O + \tfrac{1}{2}O_2$$

$$HCNO + NaOH \rightarrow NaCN + H_2O + \tfrac{1}{2}O_2$$

The above reactions used in the reactor according to the present invention is by way of example shown through the basic reaction of sodium hydroxide with HCN, HNCO and HCNO, but any alkaline or alkaline earth metal such as potassium, calcium, magnesium etc. may be used equally well.

One characteristic of the Andrussow process is that the catalyst becomes less active with use. Though the cause for such deactivation is not precisely known, it is believed to be in part due to the formation of carbon on the catalyst, which results in a blocking of part of the active sites on the catalyst surface with a thin layer of carbon. This deactivation of the active sites of the catalyst lowers the conversion of ammonia and methane to an average of around 65%.

Because of the higher cost of methane and ammonia, it is essential that available methane and ammonia sources be utilized in the most effective manner.

BRIEF DESCRIPTION OF THE INVENTION

It has now been discovered that, in a process for the synthesis of HCN and NaCN by the vapour-phase reaction of ammonia, methane and oxygen followed by the absorption of the product gas by sodium hydroxide to produce sodium cyanide, the yield of HCN and NaCN can be increased to an ammonia and methane conversion of more than 75%. Typically the conversion of ammonia and methane according to the invention is more than 90%. Such an increase is assisted by an improved mechanical construction of the reactor system, as explained infra.

DISCUSSION OF THE PRIOR ART

Considerable work has been devoted to the supplementation of HCN process feeds. For example, in U.S. Pat. No. 2,006,981, Andrussow discloses the replacement of part of the hydrocarbon feed to the process by oxygenated hydrocarbon derivatives such as methanol, and in Italian Pat. No. 845,992, assigned to Montecatini Edison, S.p.A., the supplementation of methane with acetonitrile is disclosed. Each of these supplemental feeds is also disclosed by the same references to be capable of functioning as a primary feed for the manufacture of HCN as well.

Furthermore, inert diluent materials have also been added to the reactants in various processes for making HCN. For example, in U.S. Pat. No. 2,688,531, the author Eck mentions the addition of nitrogen to the reactants in a non-catalytic process for making HCN by reaction of $CH_4$ with $NH_3$ at a temperature above 1425° C. Similarly, Bellringer et al in U.S. Pat. Nos. 2,746,843 and 3,149,914 disclose the addition of steam or nitrogen in the reaction of methanol with $NH_3$ and $O_2$ over an antimony-tin catalyst to make HCN. In the reaction of $CH_4$ with $NH_3$ and $O_2$ over a platinum group metal catalyst, Gross et al in U.S. Pat. No. 3,033,658 indicates that it is preferred to dilute the reactants with inert gases such as $N_2$ to reduce the reaction temperature. On the other hand, Sennewald et al in U.S. Pat. No. 3,254,110 gives no reason for their indicated preference for diluting their reactants with steam, $CO_2$ or $N_2$ when making HCN by reaction of propylene with $NH_3$ and $O_2$ over a molybdenum or phosphomolybdate catalyst at 300°-405° C. Likewise, Brown et al in U.S. Pat. No. 3,577,218 do not elaborate on their preference for adding $N_2$ as a diluent for an HCN process in which $NH_3$ and $CH_4$ are reacted in the absence of air over a platinum-on-alumina catalyst at 1000° C. However, in U.S. Pat. No. 3,667,907, Rushmere adds steam to the reactants for the express purpose of improving $NH_3$ conversion in the Andrussow process. Of related interest is German Pat. No. 2,421,166 which discloses using $CO_2$ in the absence of reactants to reduce the carbon build-up in the catalyst tubes of an ammonia-methane direct process and thus reduce pressure drop when the process is in operation.

DETAILED DESCRIPTION OF THE INVENTION

In the Andrussow process for making HCN, a mixture of ammonia, methane and oxygen-containing gas is fed to a reactor containing a fixed bed of platinum metal catalyst. Because the process is endothermic, it is necessary to provide methane in sufficient excess of the stoichiometric amount required to form the HCN to maintain the reaction temperature at 1000°-1200° C. The reaction gases contain mostly HCN, $N_2$, CO, $H_2$, $H_2O$, $NH_3$ and small amounts of $CH_4$, $CO_2$ and, if air is used as the oxygen-containing gas, argon. In many commercial operations, the hot reaction gases are used to generate steam and the heating values are otherwise recovered. Upon cooling to about 75° C., the reaction gases are passed through an absorber in which the $NH_3$ is removed by absorption into an aqueous solution of monoammonium phosphate to form diammonium phosphate. The diammonium phosphate is then steam stripped to separate the ammonia, which is recycled to the process, and thus monoammonium phosphate is regenerated and recycled to the cold off gas absorber. The ammonia-free reactor off gas is passed to a cold water absorber in which the HCN is removed and the HCN-free off gas, which has a heating value of about 90 BTU, is used as fuel. The pure HCN is then mixed with sodium hydroxide to produce sodium cyanide.

The Andrussow process is generally run at a catalyst temperature of from about 1000° to 1200° C. and preferably within the range of 1100° to 1200° C. The proportions of the reactants—$CH_4$, $NH_3$ and $O_2$—will ordinarily be as near stoichiometric as possible consistent with safety, the amount of $O_2$ and $CH_4$ being, of course, sufficient to provide the necessary reaction temperature. Excess quantities of $NH_3$ act mainly as a diluent and pass through the reaction system unconverted. Because of the substantial cost of treating the reaction mixture to separate the HCN product and to remove such unconverted materials, it is, of course, preferred to minimize the leakage of both unconverted $NH_3$ and unconverted $CH_4$ through the system.

These problems are reduced when sodium cyanide is produced by absorbing the reacted gases directly with sodium cyanide.

As described above, the direct production of NaCN (sodium cyanide) normally follows the Andrussow process from incoming air, ammonia and methane until the absorption of HCN (hydrocyanic acid) with NaOH (sodium cyanide). The Andrussow process may also be used following the indirect route where HCN first is isolated before it is mixed with NaOH and sometimes dried and briquetted.

The direct route, where NaCN is produced by the absorption of HCN in NaOH provides the possibility to use a new and novel process of production, i.e. the new process as shown in FIG. 1.

The new process used in a reactor according to the present invention is divided into two different process parts. One where methane is oxidized to CO under lean conditions, and one where NO is produced.

Any burner may be used to produce CO; it may also be the side product from power plants. Any CO source may be used.

The production of NO may be by the oxidation of ammonia ($NH_3$) over a Pt/Rh catalyst (or other catalysts producing NO) as in a nitric acid plant, but any source of NO may be used.

After combustion/oxidation of ammonia and methane, the reacted gases are mixed and quenched with water by direct injection or by cooling. The gas is cooled further before it is absorbed with NaOH to form NaCN.

The reactions that occur may be described by the following equations:

$$CH_4 + NH_3 \rightarrow HCN + 3H_2$$

$$2H_2 + O_2 \rightarrow 2H_2O$$

$$CH_4 + 3/2 O_2 \rightarrow CO + 2H_2O$$

$$CH_4 + 2O_2 \rightarrow CO_2 + 2H_2O$$

$$CH_4 + NH_3 + 3/2 O_2 \rightarrow HCN + 3H_2O$$

$$NH_3 + 1\tfrac{1}{4} O_2 \rightarrow NO + 3/2 H_2O$$

$$NO + CO + 3/2 H_2 \rightarrow HCNO + H_2O$$

$$NO + CO + 3/2 H_2 \rightarrow HNCO + H_2O$$

$$HNCO + NaOH \rightarrow NaCN + H_2O + \tfrac{1}{2} O_2$$

$$HCNO + NaOH \rightarrow NaCN + H_2O + \tfrac{1}{2} O_2$$

$$HCN + NaOH \rightarrow NaCN + H_2O$$

The overall reaction:

$$NH_3 + CH_4 + 1\tfrac{1}{2} O_2 + NaOH = NaCN + 4H_2O$$

Production of NaCN according to the Andrussow process burn ammonia and methane in air with conversion efficiency to HCN of 50-68%. The new process used in a reactor according to the present invention will have a conversion of 75-95% as described by FIG. 1. FIG. 1 presents a flow chart for the production of NaCN in a reactor according to the invention. Sodium may in this chart generally be replaced with any alkaline or alkaline earth metal, e.g. K, Ca or Mg. The process conditions of the process depicted in FIG. 1 are: Pressure: 1-15 bar; temperature: 750-1300° C.; ammonia concentration: 10-15 vol %; ammonia oxidation catalyst: Pt/Ru, Pt/Rh/Pd $Fe_2O_3$, $Cr_2O_3$; methane oxidation: with or without catalyst.

The above reactions according to the present invention is by way of example shown through the basic reaction of sodium hydroxide with HCN, HNCO and HCNO, but any alkaline or alkaline earth metal such as potassium, calcium, magnesium etc. as well as sodium may be used equally well.

The reactions of the above reaction equations in relation to the present invention may be carried out in a reactor system preferably designed as shown in the attached FIGS. 2a, 2b and 3a, 3b, 3c, wherein FIG. 2a shows a possible design and constitution of a reactor according to the invention, FIG. 2b shows in a cut-out from FIG. 2a, as indicated by the circle in FIG. 2a, the structure and constitution of a catalyser basket located after the inlet and distribution plates of the reactor in FIG. 2a.

Figure 3A:
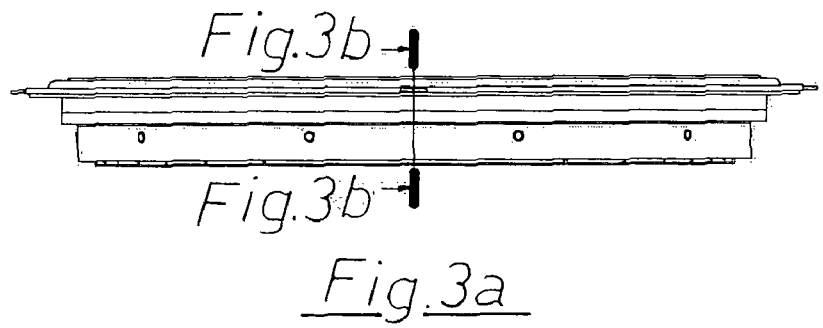
Figure 3B:
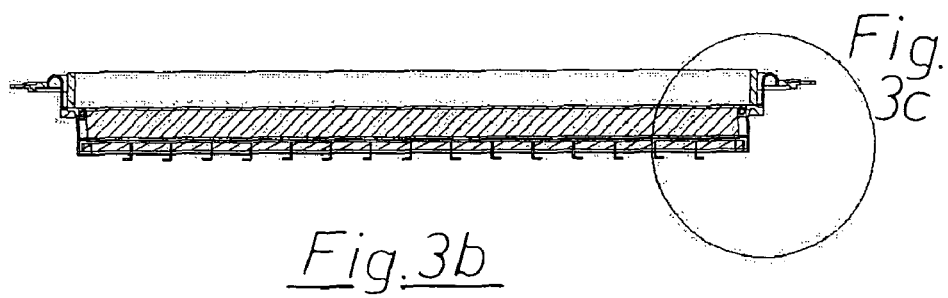
Figure 3C:
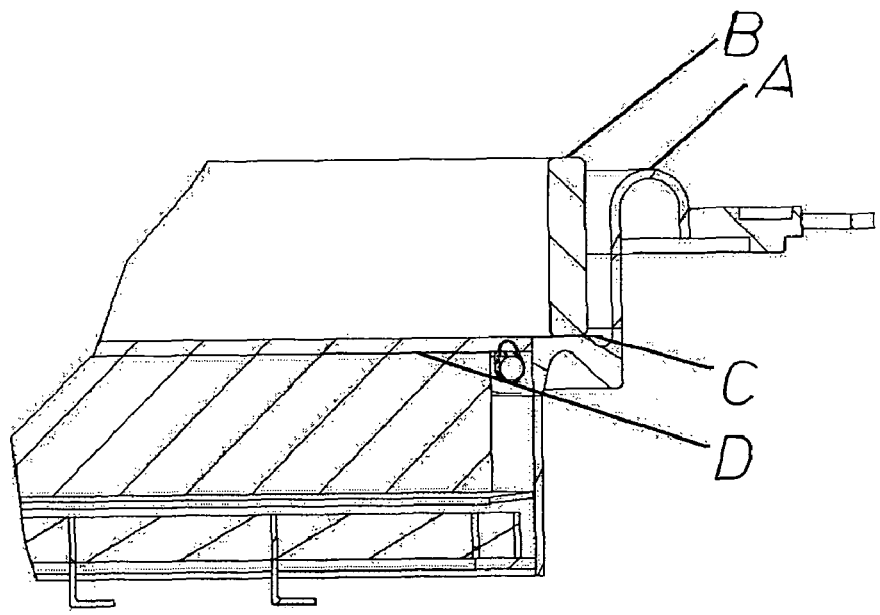

FIGS. 3a, 3b and 3c show the catalyser basket of the reactor of FIG. 2a, in FIG. 3b a sectional view of the catalyser basket of FIG. 3a, and in FIG. 3c a detailed picture of a further section of the catalyser basket of FIG. 3b, respectively.

Other advantages with the new process used in a reactor according to the present invention as compared to the Andrussow-process are:

Advantages with the new reactor system shown in the FIGS. 2a-b and 3a-c are from inlet to outlet:

1. A cone enabling higher pressure with smaller wall thickness giving lower metal weight installed. A preferred shape is an elliptical one.
2. Distribution plates giving even gas distribution over the catalyst gauzes and protecting the inlet reactor cone against high heat radiation. The number of levels of distribution plates may be in a preferred embodiment 1-4 with the optimum number of 3. The distribution plates are placed between the gas inlet of the reactor and the catalyst. The space between the plates and the inlet and catalyst is about ¼ of the total distance with the lowest plate 200-500 mm above the catalyst. The distribution plates will be perforated with small holes with a diameter of up to 20 mm, e.g. 1 to 20 mm with a pitch larger than 1 diameter, with the distribution plates spaced from each other in the flow direction of the gas, The number of holes will vary from plant to plant and will be defined by the velocity through the holes. This velocity may vary between 1 to 40 m/s with the preferred being close to 15 m/s.

The first plate closest to the inlet of the reactor may have the form of a cone with the tip of the cone pointing towards the reactor inlet. Also horizontal plates may be used or any form in between. The first distribution plate may have a diameter close to or larger than the inlet pipe inside diameter.

The second plate will have the smallest diameter close to the largest diameter of the first plate and the largest diameter 40 to 90% of the total diameter of the inside of the reactor wall. The plate may be horizontal or vertical with any shape or form between these two.

The third (last in the relevant embodiment) distribution plate will cover the whole cross section of the reactor and be horizontal.

The distribution plates are formed as concentric circles with the second and consecutive distribution plates from the gas inlet in the form of a ring with a smaller and larger diameter wherein the smaller diameter preferably lies outside of the larger diameter of the preceding ring/plate.

In the relevant embodiment the first two distribution plates are present mainly to distribute the gas, while the last (third) distribution plate acts as both a heat radiation shield and a distribution plate. The temperature in the gas stream before the last plate is close to the entering gas, while the last distribution plate will see the hot catalyst gauzes and will be heated by the radiation. This plate may have a temperature of 100 to 300° C. higher than the incoming gas. The indication "close to" concerning the temperature means that the temperature may fluctuate within a range of ±50° C., although also smaller fluctuations such as ±30° C., ±20° C. and ±10° C. may occur.

3. Construction of the catalyst basket of high alloy metals like Inconell 600 or similar to withstand the high temperature, some parts may be coated or made with ceramic-like materials to give longer lifetime.

With reference to FIG. 3c the following details are referenced:

A, Expansion bellow to take the high temperatures and flow variations. The expansion bellow may be constructed from one piece from the intersection with the reactor wall/flange to the support for the catalyst/catalyst weights. This bellow will take the tension from the high heat load and gas flow. This will make it possible to avoid cracks in the bellow and avoid bypass of reactant gases over the catalyst. The bypass of reactant gases will cause reactions on the lower heat exchangers in the reactor causing loss of product end erosion of the equipment.

B, Catalyst weights to protect the expansion bellow and keep the catalyst gauzes (C) in place. The catalyst weights have at least two main purposes. One is to keep the gauze in place during operation and to protect the expansion bellow from high heat radiation. The weights may be constructed as one ring divided in parts with clips to keep it from falling down with a height enough to protect the expansion bellow.

C. Catalyst gauzes made of standard or new type of alloy consisting mainly of woven or knitted Pt/Rh wires. The standard catalyst consists of 90/10 Pt/Rh with a wire diameter of 0.076 mm and a number of meshes of 1024. The invention may however be used for any type of catalyst woven, knitted or any form of supported catalyst.

D. Catalyst support that enables expansion to take place and that allows for a good support of the catalyst enabling long catalyst life and high conversions. The catalyst support consists of several parts. The part close to the catalyst consists of a ring divided in several parts following the inner diameter of the catalyst basket. It is connected to the basket in a way that enables it to follow expansion and contraction that may occur during operation of a plant of this type. Connected to this ring is flexible support gauze that will give the catalyst even support throughout the whole campaign. Below this ring and support gauze there is a ceramic layer (e.g. rashig rings or similar) that also supports the catalyst and at the same time acts as insulation towards the colder surfaces of the heat exchangers/boiler downstream the catalyst.

The catalyst support will enable longer campaign lengths and higher conversion rates because the catalyst will not break giving room for the reactant gases to bypass the catalyst.

The ceramic layer is supported by a screen and beams that may be cooled by the heat exchangers below.

Further, with reference to FIG. 2b the following details are referenced:
E. Cooled support of the catalyst basket to avoid disintegration and braking down of the catalyst support
F. Cooling of the product gases by the use of high alloy heat exchanger immediately below the reactor.

Further, with reference to FIG. 2a the following details are referenced:
G. Distribution plates (the reference $G_\alpha$ indicating the first distribution plate and $G_\omega$ indicating the last/ultimate distribution plate prior to the catalyst gauze (C)). The first distribution plate ($G\alpha$) near the inlet of the reactor has preferably the form of a cone with the apex of the cone pointing towards the reactor inlet, and has as an alternative, and preferably, a diameter close to or larger than the diameter of the inlet pipe for the reaction gases.
H Reactor cone (of preferably but not necessarily an elliptical shape forming a distribution chamber for the gases containing the distribution plates G).
I Gas inlet (depicted as entering axially at the apex of the reactor cone, but may also be located non-axially in the reactor cone H, e.g. in the side wall of the reactor cone, in which case the distribution plates will be located in the flow direction of the gas entering the reactor cone H).

Other advantages with the new invention are:
smaller equipment—lower investments.
lower operational costs per ton produced due to:
  a, higher yield and conversion
  b, lower catalyst costs
  c, longer campaign length
  d, reduced maintenance
  e, reduced manpower
  f, reduced electric consumption
  g, reduced emissions of $NH_3$, HCN, NO, CO, $CO_2$ etc.

The novelty with the new process used in a reactor according to the present invention is that HCN/NaCN is produced by the ammonia oxidation reaction and by the methane oxidation reaction executed separately or simultaneously.

The pressure of the new process used in a reactor according to the present invention is not critical and it may be carried out at either increased or reduced pressure e.g. in the range of 1-30 bar in accordance with the engineering economics of the particular plant being considered. Most Andrussow-type operations are conducted at slightly above atmospheric pressure, e.g., 5-10 psig (1.4-1.8 bar)

Quite a large variety of oxidative catalytic materials may be used in the practice of the new process used in a reactor according to the invention e.g. catalytic materials such as is indicated in U.S. Pat. No. 1,934,838. By far the most widely used catalysts for this process are the noble metal catalysts, including platinum, iridium, rhodium, palladium, osmium, gold and silver and alloys thereof. However, oxide catalysts have also been used such as $Fe_2O_3/Bi_2O_3/MoO_3/P_2O_5/SiO_2$ which is disclosed in U.S. Pat. No. 3,516,789 to Sennewald, mixed antimony and stannic oxides which are taught by Bellringer in U.S. Pat. No. 3,149,914, molybdenum oxide as described in U.S. Pat. No. 2,746,843 and the rear earth metals which are also referred to in the above-cited patent to Andrussow U.S. Pat. No. 1,934,838. In U.S. Pat. No. 3,254,110, Sennewald discloses that combinations of transition metal oxides with molybdenum oxide are good catalysts for preparing nitriles. However, of all these, platinum/rhodium is used most extensively.

Though there appears to be no reason why the invention would not be operable in other than fixed bed operation, nevertheless, the process used in a reactor according to the present invention is normally carried out over a fixed bed of the catalyst in foraminous form such as pellets, spheres, chips, net, screen or gauze. When in particulate form, the catalyst will usually be supported on an inert carrier having an average dimension of 0.16 to 1.0 cm. The catalyst is quite often in the form of several layers of fine mesh gauze through which the reactant gases are passed downwardly.

Though not essential to obtaining the benefits of the invention, the economics of the process of the invention are improved when heat recovery for the reaction is maximized, e.g., by use of the reactor modifications described and claimed in U.S. Pat. No. 2,782,107 to Inman and U.S. Pat. No. 3,215,495 to Jenks.

Below are two examples related to the performance of cyanide producing reactor. The first example is with the traditional reactor and catalyst, while the second is the reactor according to the invention.

Example 1

The traditional reactor has no distribution or radiation protection and the catalyst support is simple with no expansion possibilities for the catalyst support. Further the heat is removed by direct quench of water to the hot reacted gases. The running of the catalyst was done with 12 vol % ammonia, 13 vol % natural gas, 75 vol % air, pressure of 4 bar, specific catalyst load of 25 $tN/m^2d$, 16 catalyst gauzes 90/10 Pt/Rh at 1024 meshes with a wire diameter of 0.076 mm. The measured temperature in the catalyst was 1050° C.

The campaign length was 70 days with an efficiency of 50-55% (conversion of ammonia to HCN). The campaign had to be aborted due to cracks in the catalyst.

Example 2

The reactor was designed according to the invention with distribution and radiation protection plates at the upper part of the reactor. The catalyst support was as described by the invention. The reactor was run at the same conditions as described in example 1. The campaign length was 100 days with an efficiency of 70-75% and there were no cracks in the catalyst due to the improved mechanical design of the catalyst support. The distribution and radiation protection enabled less heat loss and improved distribution over the whole catalyst surface enabling better reaction condition for the reactants.

The improvements are clearly defined by the examples described above and operational costs are saved both by the reduced expenses from the catalyst and by use of less raw materials. In addition the emission to the atmosphere of green house gases are reduced dramatically.

PRIOR ART REFERENCES

| U.S. Patent Documents | | | |
|---|---|---|---|
| 1,957,749 | May, 1934 | Andrussow et al. | 423/376. |
| 2,478,875 | August, 1949 | Merill et al. | 423/376. |
| 2,800,402 | July, 1957 | Ludeman | 423/415. |
| 2,920,940 | January, 1960 | Kronacher | 423/376. |
| 3,033,658 | May, 1962 | Gross | 423/376. |
| 3,254,110 | May, 1966 | Sennewald | 260/465. |
| 4,107,278 | August, 1978 | Wang | 423/376. |
| 4,521,395 | June, 1985 | Kuechler et al. | |
| 4,847,062 | July, 1989 | Rogers et al. | 423/379. |

| U.S. Patent Documents | | | |
|---|---|---|---|
| 5,356,213 | October, 1994 | Arpentinier. | |
| 5,360,603 | November, 1994 | Drnevich et al. | 423/376 |

OTHER REFERENCES

Mellor, Treatise on Inorganic and Theoretical Chemistry, vol. 5, Longmans, Green, N.Y., (1924), pp. 817, 818.

The invention claimed is:

1. Reactor for converting methane, ammonia and oxygen and alkaline or alkaline earth hydroxides into alkaline or alkaline earth cyanides by two-stage reactions;
   1—a catalytic reaction process over a catalyst material between ammonia, methane and oxygen wherein hydrogen cyanide, carbon monoxide/dioxide and water are formed, wherein the reaction gases are mixed, and
   2—the gases being cooled prior to being absorbed with an alkaline or alkaline earth hydroxide for producing a corresponding cyanide, characterized in the reactor comprising a first stage with a gas inlet (I), wherein the first stage is formed by a cone (H) with distribution plates (G) providing an even gas distribution over the catalyst material (C) wherein the distribution plates (G) are located between the gas inlet (I) of the reactor and the catalyst material (C), and the distribution plates (G) being perforated with a number of holes with a diameter less than 20 mm with a pitch larger than 1 diameter, with the distribution plates spaced from each other in the flow direction of the gas, the first distribution plate (Gα) functioning mainly to distribute the gas, whereas the last distribution plate (Gω) works as a heat radiation shield and as a distribution plate facing the catalyst material (C), and wherein the catalyst material (C) is present in the form of catalyst gauze (C) fixed by catalyst weights (B).

2. Reactor according to claim 1, characterized in that the number of levels over the distribution plates (G) is in the range of 1-4.

3. Reactor according to claim 1, characterized in that the velocity of the inlet gas lies within the interval 1 to 40 m/s.

4. Reactor according to claim 1, characterized in that the first distribution plate (Gα) near the inlet of the reactor has the form of a cone with the apex of the cone pointing towards the reactor inlet.

5. Reactor according to claim 1, characterized in that the first distribution plate ($G_\alpha$) has a diameter close to or larger than the inner diameter of the inlet pipe for reaction gases.

6. Reactor according to claim 1, characterized in that the diameter of the consecutive distribution plates varies to cover between 40 to 90 % of the total internal diameter of the reactor wall.

7. Reactor according to claim 1, characterized in that the last distribution plate (Gω) covers the entire cross section of the reactor and is preferably horizontal.

8. Reactor according to claim 1, characterized in that the catalyst gauze comprises an alloy of noble metal catalysts including platinum, iridium, rhodium, osmium, gold and silver as well as alloys thereof and/or oxide catalysts such as $Fe_2O_3/Bi_2O_3/MoO_3/P_2O_5/SiO_2$ and most preferred woven or meshed Pt/Rh-wire.

9. Reactor according to claim 8, characterized in that the catalyst comprises wire of 90/10 Pt/Rh with a wire diameter of 0,076 mm and a number of mesh openings of 1024.

10. Reactor according to claim 1, characterized in that to the catalyst gauze is supported by a support device comprising a material that is able to withstand a temperature of up to about 1500 ° C. having a metal or ceramic netting being supported by a refractory layer fixed by a basket being connected to an expansion bellows.

11. Reactor according to claim 1, characterized in that that the first stage of the reactor supports a reaction between methane, ammonia and oxygen for producing hydrogen cyanide, water and carbon monoxide and carbon dioxide, and wherein the reaction products from this reaction are reacted further with an alkaline or alkaline earth metal hydroxide for producing alkaline or alkaline earth metal cyanide.

12. Reactor according to claim 11, characterized in that the alkaline metal hydroxide is sodium and wherein the reactions of the reactor comprise:

$$CH_4 + NH_3 \rightarrow HCN + 3H_2$$

$$2H_2 + O_2 \rightarrow 2H_2O$$

$$CH_4 + 3/2 O_2 \rightarrow CO + H_2O$$

$$CH_4 + NH_3 + 3/2 O_2 \rightarrow HCN + 3H_2O$$

$$NH_3 + 1\frac{1}{4} O_2 \rightarrow NO + 3/2 H_2O$$

$$NO + CO + 3/2 H_2 \rightarrow HCNO + H_2O$$

$$NO + CO + 3/2 H_2 \rightarrow HNCO + H_2O$$

$$HNCO + NaOH \rightarrow NaCN + H_2O + \frac{1}{2} O_2$$

$$HCNO + NaOH \rightarrow NaCN + H_2O + \frac{1}{2} O_2$$

$$HCN + NaOH \rightarrow NaCN + H_2O.$$

13. Reactor according to claim 1, characterized in that the pressure in the reactor lies in the interval 1-30 bar.

* * * * *